United States Patent [19]

Neuenschwander

[11] Patent Number: 4,559,838

[45] Date of Patent: Dec. 24, 1985

[54] SCOTCH YOKE PISTON AND CRANKSHAFT CONNECTION WITH FLOATING CRANK PIN

[76] Inventor: Victor L. Neuenschwander, Box 1098, Bloomfield, N. Mex. 87413

[21] Appl. No.: 539,822

[22] Filed: Oct. 6, 1983

[51] Int. Cl.[4] ............................................. F16H 21/18
[52] U.S. Cl. ........................................ 74/50; 74/569; 403/13; 403/361
[58] Field of Search ................... 74/50, 569, 595, 597, 74/598; 403/13, 361

[56] References Cited

U.S. PATENT DOCUMENTS

| | | | |
|---|---|---|---|
| 235,905 | 12/1880 | Schultz | 74/50 |
| 530,618 | 12/1894 | Herdman | 74/50 X |
| 729,972 | 6/1903 | Steele | 74/50 X |
| 829,735 | 8/1906 | Ramsey | 74/50 |
| 2,512,185 | 6/1950 | Thompson | 74/50 |
| 2,735,314 | 2/1956 | Meile | 74/598 |
| 2,747,428 | 5/1956 | Peter et al. | 74/598 |
| 3,374,683 | 3/1968 | Jesse | 74/50 |
| 3,970,158 | 7/1976 | Black et al. | 403/361 X |

*Primary Examiner*—William E. Tapolcai
*Attorney, Agent, or Firm*—Harvey B. Jacobson

[57] ABSTRACT

A scotch yoke connection between a piston rod and crankshaft comprises a free floating crank pin having a central portion of retangular cross section received directly between opposed internal bearing surfaces of the yoke, and end portions of circular cross section freely journalled in crankshaft flanges on opposite sides of the yoke. When the yoke is removed, the crank pin can be rotated to present a different pair of opposite surfaces to the bearing surfaces of the yoke thereby providing wear compensation. The bearing surfaces of the yoke may be defined by replaceable liner plates.

10 Claims, 4 Drawing Figures

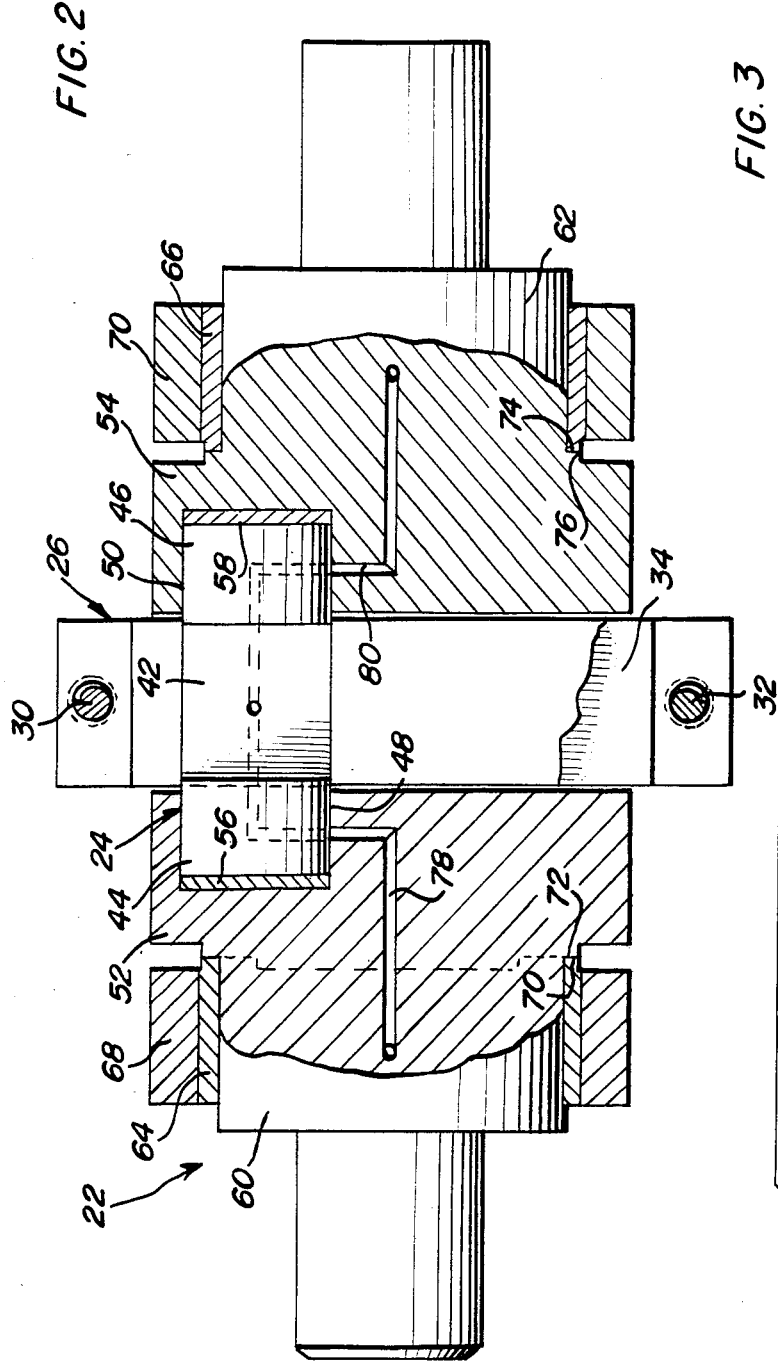
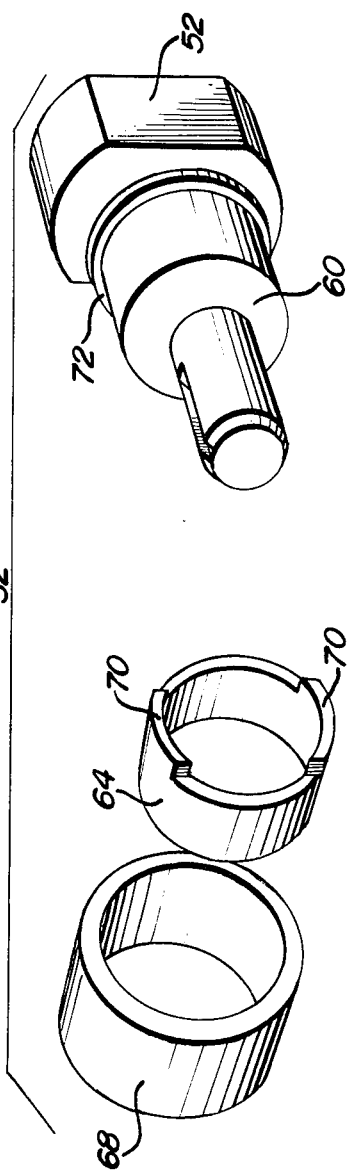
FIG. 2
FIG. 3

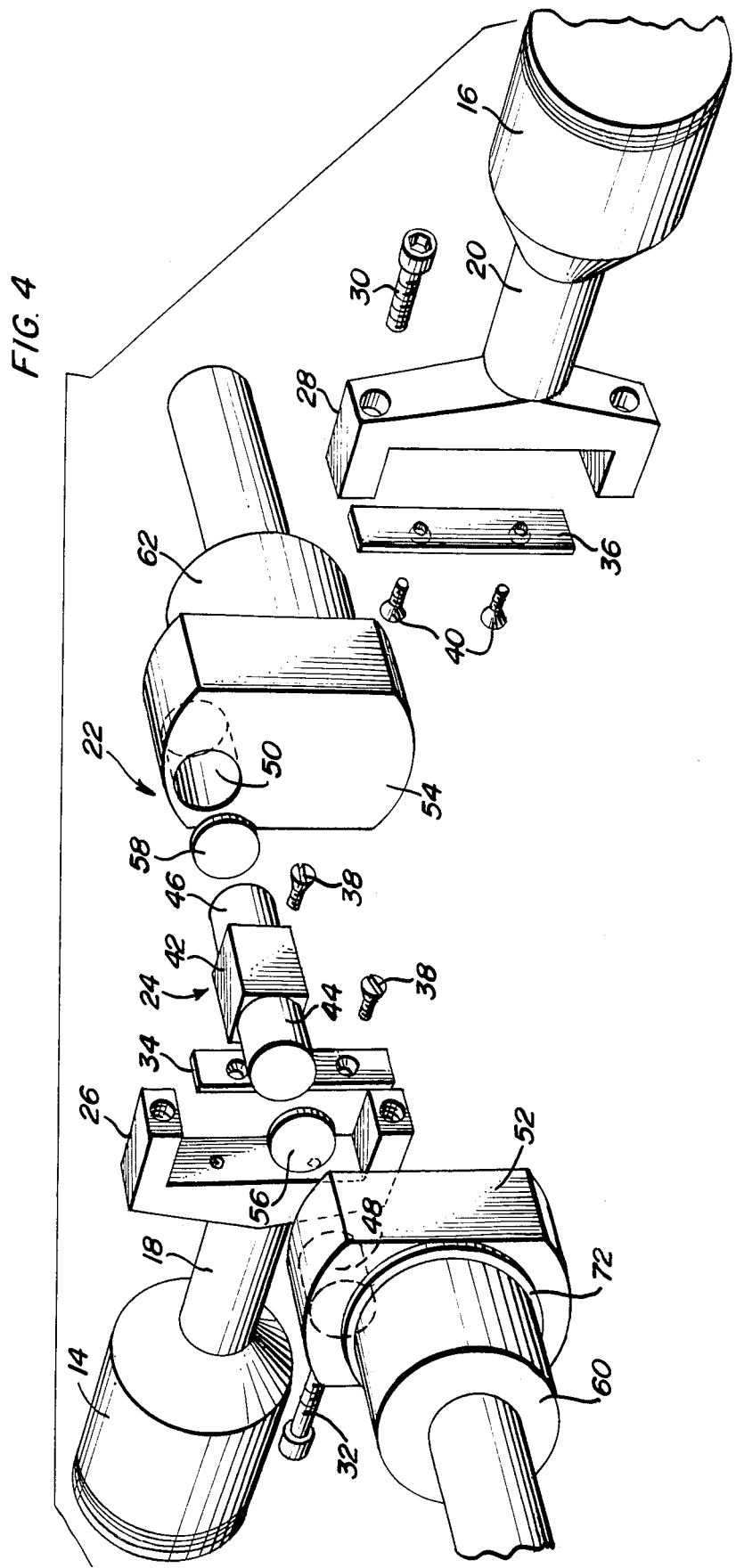

SCOTCH YOKE PISTON AND CRANKSHAFT CONNECTION WITH FLOATING CRANK PIN

BACKGROUND OF THE INVENTION

This invention relates to piston rod/crankshaft connections of the type in which a piston rod is rigidly connected to a frame-like member known as a scotch yoke having an internal elongate guideway which accommodates a crank pin. With this arrangement, linear reciprocatory movement of the piston rod and yoke is accompanied by rotation of the crankshaft and reciprocatory movement of the crank pin in the guideway transversely to the direction of movement of the rod and yoke.

Scotch yoke-type piston rod/crankshaft connections can be used both in converting piston reciprocation into crankshaft rotation, i.e. in engines or motors, or in converting crankshaft rotation into piston reciprocation, as in compressors or pumps, and such connections are useful, for example, in allowing opposed pistons to be connected to a common crank pin directly in line. Known scotch yoke connections generally employ solid or one-piece crankshafts with a circular-section crank pin and various bearing blocks, roller assemblies, and the like interposed between the crank pin and opposite bearing surfaces of the yoke guideway. These assemblies are prone to impact failure and premature wear due to the provision of multiple wear surfaces. The present invention provides an improved scotch yoke-type piston rod/crankshaft connection having improved wear resistance compared with prior structures and a reduction in the number of wear surfaces.

STATEMENT OF PRIOR ART

Applicant acknowledges the following U.S. patents pertaining generally to piston rod/crankshaft connections, none of which is believed to disclose the features of the present invention: U.S. Pat. Nos. 283,099; 1,807,830; 1,759,233; 1,765,927; 2,374,907; 2,747,428.

SUMMARY OF THE INVENTION

A scotch yoke connection between a piston rod and crankshaft in accordance with the invention utilizes a free-floating crank pin having a central portion of rectangular cross section which is received directly between opposed internal bearing surfaces of the yoke, the crank pin having end portions of circular cross section rotatably journalled in crankshaft flanges on opposite sides of the yoke respectively.

Use of a free-floating crank pin provides ease of replacement, and allows the crank pin to be rotated to present different faces of the rectangular central portion to the opposed bearing surfaces of the yoke, so as to compensate for wear. The bearing surfaces of the yoke may be defined by replaceable liner plates, further enhancing the wear compensating facility of the assembly.

Opposite ends of the free-floating crank pin may be received in journal openings formed in the respective crankshaft flanges, with thrust buttons, shims, or like inserts interposed between the respective end faces to provide for axial adjustment of the crank pin relative to the yoke and axial thrust resistance.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 2 is a cross-sectional view on line 2—2 of FIG. 1.

FIG. 3 is an exploded view showing parts of a crankshaft using the assembly.

FIG. 4 is an exploded view of the entire assembly.

DESCRIPTION OF PREFERRED EMBODIMENT

Figure 1:
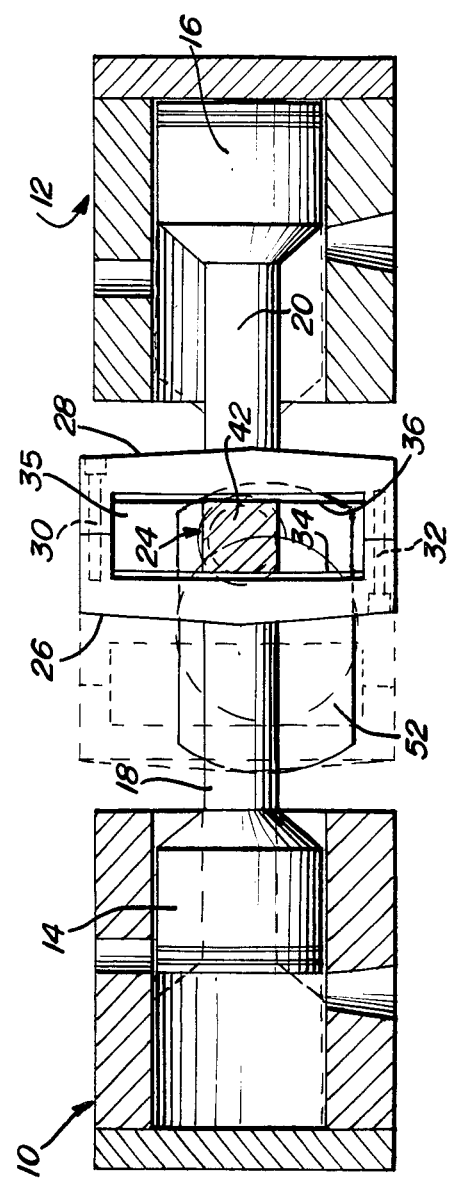
FIG. 1 is an elevational view, partly in section, of parts of an internal combustion engine including a piston rod/crankshaft connection assembly in accordance with the invention.

FIG. 1 of the drawings illustrate (somewhat diagrammatically) a pair of directly in line opposed cylinders 10 and 12 of an internal combustion engine, for example. The cylinders are fitted with respective pistons 14 and 16, with piston rods 18 and 20, and in order to convert piston reciprocation into rotation of a crankshaft 22 (see FIGS. 2 and 4) use is made of a scotch yoke-type connection between the respective piston rods and a crank pin 24 of the crankshaft.

The piston rods have rigid connections at their ends opposite to respective pistons with respective yoke members 26, 28 which are connected together by Allen screws 30, 32 or the like to form a scotch yoke having an elongate interior guideway 35 receiving crank pin 24, the guideway extending transversely in relation to the piston rods. Linear plates 34, 36 are provided for the opposed internal surfaces of the respective yoke members, the liner plates being of suitable bearing material such as phosphor bronze or the like and being releasably secured to the respective yoke members by screws 38, 40 countersunk into the liner plates so as to provide small receptacles in which lubricant may collect.

Crank pin 24 has a central portion 42 of square cross section, opposite faces of which fit between the liner plates 34, 36 in the scotch yoke, and circular-section end portions 44, 46. The end portions are received in blind bearing openings 48, 50 in respective crankshaft flanges 52, 54, with interposed thrust buttons or shims 56, 58, if required, between the ends of the pin and the ends of the respective bearing openings, to accommodate axial adjustment of the crank pin and resistance to axial thrust. The crank pin thus floats freely in the respective crankshaft flanges. The width of the central portion of the crank pin preferably conforms to the width of the liner plates and the scotch yoke.

The crankshaft flanges include integral main bearing portions 60, 62, which are received in main bearings 64, 66 respectively, the bearings having respective bearing caps 68, 70 suitably carried in the engine housing in a manner not shown. Cooperative thrust surfaces 70, 72 and 74, 76 are provided on the bearings and the crankshaft flanges respectively. Lubrication from a pressurized lubrication system may be provided to the crank pin bearings and crank pin surfaces by means of lubrication ducts 78, 80 extending through the main bearings, the crankshaft flanges and the crank pin.

It will be appreciated that the scotch yoke/crankshaft assembly incorporating a free-floating crank pin as described, facilitates removal and re-positioning of the crank pin (by rotation of the crank pin through 90° to utilize opposite surfaces against the liner plates) and replacement of the liner plates, thereby improving the life of the assembly by providing wear compensation.

Also, the provision of thrust buttons at the ends of the crank pin accommodates crankshaft-to-yoke misalignments and provides axial thrust resistance.

While the invention has been described in relation to an internal combustion engine, it is also applicable to motors in general, to compressors, pumps, or the like.

The floating crank pin as described above eliminates the need for bearing blocks as used in the prior art structures, utilizes fewer parts, and facilitates lubrication. The floating crank pin may also provide greater impact resistance by distributing initial thrust over the full rod face of the pin and dissipating such thrust in the bearings of the crank flanges. Piston thrust is distributed across a wide flat surface rather than a round crown, which results in less deflection loss and higher efficiency.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a scotch yoke-type connection between a reciprocatory rod and a rotary crankshaft having a crank pin which is received in an elongate guideway defined internally of a scotch yoke, and the rod is connected to the exterior of the scotch yoke, the improvement wherein the crank pin has a central portion of square cross-section having one pair of opposite surfaces received directly between opposed bearing surfaces of said guideway, and circular section end portions rotatably journalled in bearing openings formed in respective crankshaft flanges disposed on opposite sides of the yoke, and wherein the yoke comprises two mutually separable yoke members which, when separated, allow the crank pin to be rotated for receipt of the other pair of opposite surfaces of the crank pin between the bearing surfaces of the yoke.

2. The invention of claim 1 wherein the scotch yoke includes removable internal liner plates forming bearing surfaces for opposite surfaces of the central portion of the crank pin.

3. The invention of claim 2 wherein the liner plates are secured to the yoke by screws countersunk into the bearing surfaces of the liner plates so as to provide receptacles for lubricant.

4. The invention of claim 1 including insert means for receipt in the respective bearing openings at the respective ends of the crank pin to provide axial adjustment of the crank pin and yoke if required.

5. The invention of claim 4 wherein the crankshaft flanges are provided with main bearing portions received in respective main bearings with thrust surfaces provided between the respective bearings and bearing portions.

6. A piston rod/crankshaft assembly comprising a scotch yoke connected to a piston rod, the yoke defining an internal elongate guideway extending transversely to the piston rod, and a solid crank pin having a portion of square cross section received in said guideway with opposed surfaces of said crank pin portion bearing against opposed bearing surfaces of the guideway, the crank pin having a further portion of circular cross section external to the yoke, said further portion of the crank pin being rotatably journalled in a bearing opening formed in a flange of the crankshaft.

7. The invention of claim 6 wherein the crank pin has opposed portions each of circular cross section at opposite ends of the square portion respectively, the opposed portions each being rotatably received in a journal opening in a respective crankshaft flange.

8. The invention of claim 7 including insert means receivable in the respective journal openings to provide alignment compensation for the crank pin and scotch yoke.

9. The invention of claim 6 wherein the bearing surfaces are defined by removable liner plates secured to the yoke.

10. The invention of claim 6 wherein the scotch yoke comprises a pair of separable yoke members, and releasable attachment means between said members providing for separation of said members and removal of the yoke from the crank pin.

* * * * *